US009077666B2

(12) United States Patent
Coy et al.

(10) Patent No.: US 9,077,666 B2
(45) Date of Patent: Jul. 7, 2015

(54) SERVICE SEGREGATION ACCORDING TO SUBSCRIBER SERVICE ASSOCIATION

(71) Applicant: International Business Machines Corporation, Armonk, NY (US)

(72) Inventors: Henry R. Coy, Austin, TX (US); Steven L. Jones, Austin, TX (US); George D. Lauer, Montgomery, AL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/065,991

(22) Filed: Oct. 29, 2013

(65) Prior Publication Data

US 2014/0059223 A1  Feb. 27, 2014

Related U.S. Application Data

(63) Continuation of application No. 12/580,370, filed on Oct. 16, 2009, now Pat. No. 8,584,217.

(51) Int. Cl.
| | |
|---|---|
| *G06F 15/173* | (2006.01) |
| *G06F 15/16* | (2006.01) |
| *H04L 12/911* | (2013.01) |
| *H04L 12/721* | (2013.01) |
| *H04W 12/06* | (2009.01) |
| *H04L 29/08* | (2006.01) |
| *H04W 12/08* | (2009.01) |
| *H04W 88/16* | (2009.01) |

(52) U.S. Cl.
CPC ............ *H04L 47/70* (2013.01); *H04L 67/2804* (2013.01); *H04L 67/2861* (2013.01); *H04L 67/2819* (2013.01); *H04L 45/38* (2013.01); *H04W 12/06* (2013.01); *H04W 12/08* (2013.01); *H04W 88/16* (2013.01)

(58) Field of Classification Search
None
See application file for complete search history.

(56) References Cited

U.S. PATENT DOCUMENTS 7,340,048 B2   3/2008  Stern et al.
7,397,819 B2 *  7/2008  Kobayashi ................... 370/469
(Continued)

OTHER PUBLICATIONS

Website Optimization.com; HTTP Compression; Nov. 6, 2007 (last modified date); WebSite Optimization.com; http://www.websiteoptimization.com/speed/tweak/compress/.
(Continued)

*Primary Examiner* — Faruk Hamza
*Assistant Examiner* — Andrew Oh
(74) *Attorney, Agent, or Firm* — Robert C. Rolnik

(57) ABSTRACT

Processing a plurality of packets through at least one service, a privilege granter monitors at least two authentication packets to obtain a source unique network identifier, one of which does not have a vendor specific attribute and detects an authentication packet among the at least two authentication packets, and the authentication packet having the vendor specific attribute. The privilege granter receives at least one response authentication packet having at least one service definition identifier, the service definition identifier corresponding to the source unique network identifier, responsive to detecting the authentication packet having the vendor specific attribute and builds an entitlement database to pair the source unique network identifier to the service definition identifier. The privilege granter receives a session packet and determines that the source unique network identifier corresponds to a user entitlement in the entitlement database. The privilege granter routes the session packet to an addressable service.

18 Claims, 5 Drawing Sheets

(56) References Cited

U.S. PATENT DOCUMENTS

| | | | |
|---|---|---|---|
| 7,738,452 B1* | 6/2010 | O'Rourke et al. | 370/389 |
| 7,965,659 B1* | 6/2011 | Doran | 370/260 |
| 8,584,217 B2* | 11/2013 | Coy et al. | 726/7 |
| 2002/0097736 A1* | 7/2002 | Cohen | 370/419 |
| 2002/0138848 A1* | 9/2002 | Alao et al. | 725/109 |
| 2004/0010621 A1* | 1/2004 | Afergan et al. | 709/247 |
| 2004/0133806 A1* | 7/2004 | Joong et al. | 713/201 |
| 2005/0027787 A1* | 2/2005 | Kuhn et al. | 709/200 |
| 2006/0114872 A1* | 6/2006 | Hamada | 370/338 |
| 2007/0245007 A1 | 10/2007 | Tsirtsis et al. | |
| 2007/0255852 A1 | 11/2007 | McBride et al. | |
| 2008/0002669 A1* | 1/2008 | O'Brien et al. | 370/352 |
| 2008/0028445 A1* | 1/2008 | Dubuc et al. | 726/5 |
| 2008/0046596 A1* | 2/2008 | Afergan et al. | 709/247 |
| 2009/0193071 A1* | 7/2009 | Qiu et al. | 709/203 |
| 2009/0271851 A1* | 10/2009 | Hoppe et al. | 726/6 |
| 2009/0319683 A1* | 12/2009 | Martin | 709/238 |
| 2009/0319685 A1* | 12/2009 | Martin | 709/240 |
| 2010/0074261 A1* | 3/2010 | Muhamed | 370/395.3 |
| 2010/0098092 A1* | 4/2010 | Luo et al. | 370/401 |
| 2010/0128998 A1* | 5/2010 | Wegener et al. | 382/248 |
| 2011/0090907 A1* | 4/2011 | Coy et al. | 370/392 |
| 2014/0059223 A1* | 2/2014 | Coy et al. | 709/225 |

OTHER PUBLICATIONS

Blumenthal, M.; Rethinking the Design of the Internet: The End-to-End Arguments vs. The Brave New World; Aug. 2001; pp. 70-109; vol. 1, No. 1; ACM Transactions on Internet Technology.

Bouganim, L.; Dynamic Access-Control Policies on XML Encrypted Data; Jan. 2008; pp. 1-37; vol. 10, No. 4, Article 16; ACM Transactions on Information and System Security.

Lopez, R.; Improved EAP Keying Framework for a Secure Mobility Access Service; Jul. 2006; pp. 183-188; ACM.

Carstens, Juergen.; Traffic Rejection Customized for Privileged Subscribers; Oct. 10, 2005; pp. 1-2; IP.com.

Tan, H.; Secure Multi-hop Network Programming With Multiple One-way Key Chains; Mar. 2008; pp. 183-193; ACM.

Wang, H.; IP Easy-pass: Edge Resource Access Control; Sep. 2004; pp. 2583-2593; IEEE.

Andrew Chung Suk Oh; Office Action; Dec. 10, 2012; USPTO.
Andrew Chung Suk Oh; Final Office Action; May 22, 2013; USPTO.
Andrew Chung Suk Oh; Notice of Allowance; Jul. 01, 2013; USPTO.

* cited by examiner

ENTITLEMENT DATABASE RECORD 270

AUTHENTICATION PACKET, E.G. RADIUS ACCOUNTING REQUEST START 400

SESSION PACKET 450

SERVICE DEFINITION 500

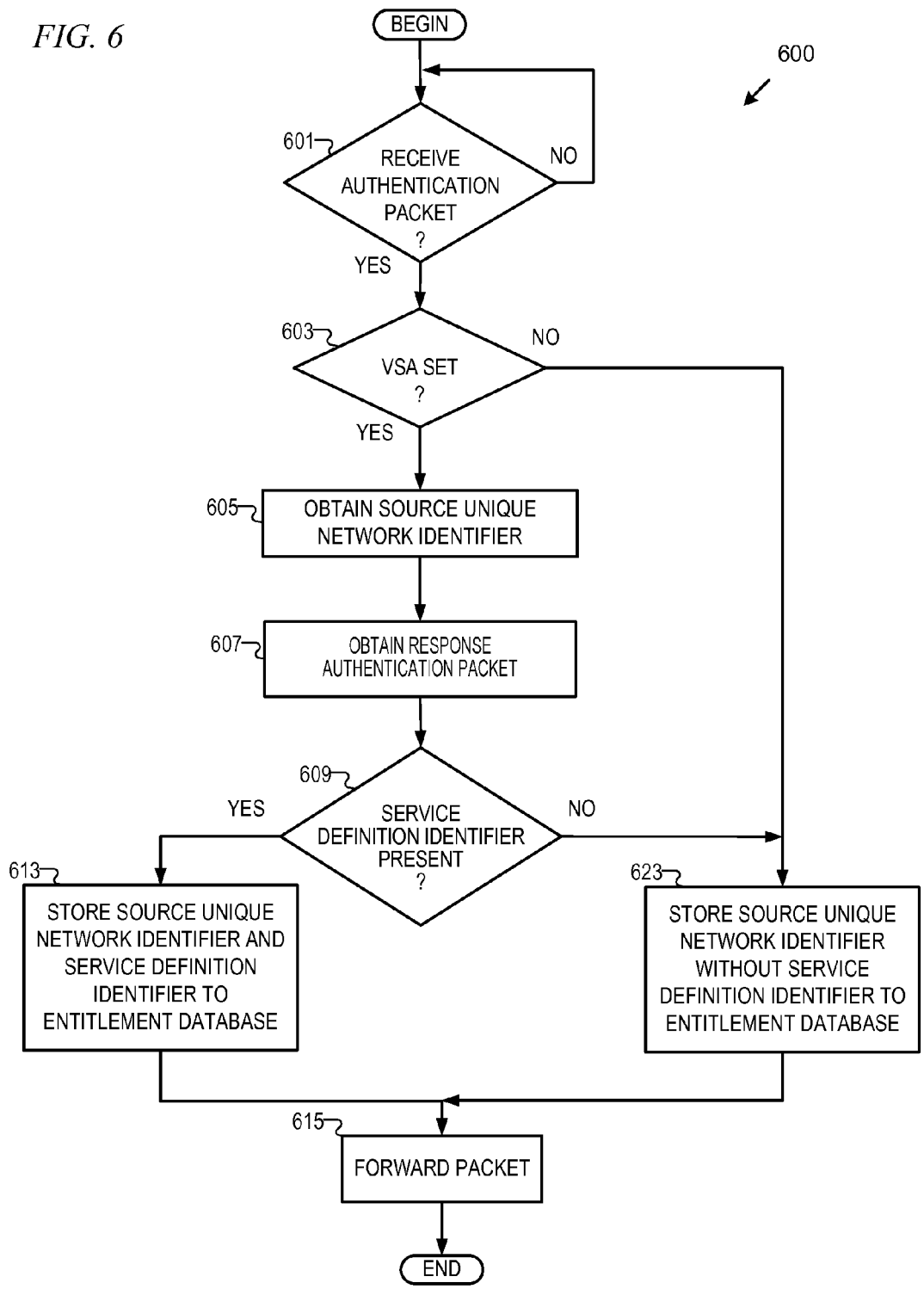

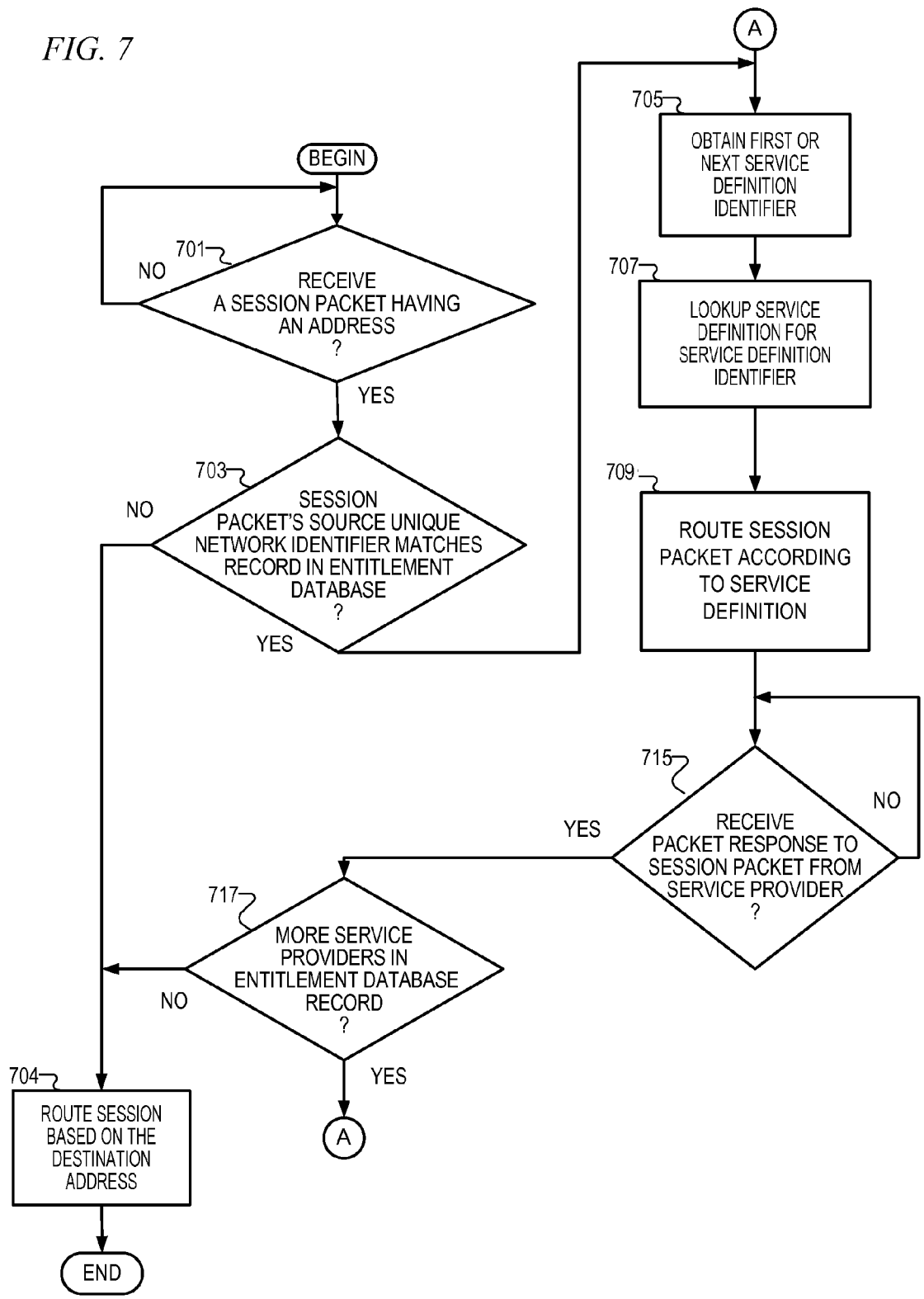

SERVICE SEGREGATION ACCORDING TO SUBSCRIBER SERVICE ASSOCIATION

This application claims benefit of priority of patent application Ser. No. 12/580,370, filed on Oct. 16, 2009, which is herein incorporated by reference.

BACKGROUND

The present invention relates generally to a computer implemented method, data processing system, and computer program product for routing. More specifically, the present invention relates to routing along a path determined based on an authentication of an endpoint of a session.

Wireless carriers have provided considerable flexibility to users of wireless devices in recent years. A wireless carrier is an entity, which has a license to operate wireless services over frequencies allocated to the wireless carrier by authority of a governmental body. Cellular carriers or infrastructure providers are examples of wireless carriers. During the early decades of the industry, cellular, and other wireless infrastructure providers, have provided limited data functionality for their respective mobile subscribers and other wireless devices.

One feature particularly helpful among cellular carriers is the exchanged and sometimes reciprocal allowance for mobile subscribers of a first network to use infrastructure of a second network operated by a second wireless carrier. This reciprocal right to use, and be billed for, services of allied wireless carriers, is known as roaming. Between the wireless carriers of the first network and the second network, the carriers arrange accounting for such roaming in a manner that permits mobile subscribers to be used in areas where their home network simply does not cover.

The basic services offered by wireless carriers, for example, in the cellular telephony business, tend to be either identical, or virtually the same among consumers of these services. However, wireless carriers often differentiate themselves by arranging a wide variety of data intensive and sometimes internet driven services. Some of these services require significant investment by the wireless carriers in the infrastructure that they directly own or operate.

Accordingly it can be beneficial to overcome the stated disadvantages of the prior art.

BRIEF SUMMARY

The present invention provides a computer implemented method, computer program product, and apparatus to process a plurality of packets through at least one service. A privilege granter monitors at least two authentication packets to obtain a source unique network identifier for a subscriber among a plurality of subscribers, wherein at least one among the authentication packets has a vendor specific attribute and wherein at least one among the authentication packets does not have a vendor specific attribute. The privilege granter detects an authentication packet among the at least two authentication packets, the authentication packet having the vendor specific attribute. The privilege granter receives at least one response authentication packet having at least one service definition identifier, the service definition identifier corresponding to the source unique network identifier, responsive to detecting the authentication packet having the vendor specific attribute. The privilege granter builds an entitlement database to pair the source unique network identifier to the service definition identifier. The privilege granter receives a session packet having the source unique network identifier as a target address or a source address. The privilege granter looks up to determine that the source unique network identifier corresponds to at least one user entitlement in the entitlement database. The privilege granter routes the session packet to an addressable service corresponding to the user entitlement, responsive to the determination that the source unique network identifier corresponds to at least one user entitlement.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a flowchart that describes steps to monitor authentication packets in accordance with an illustrative embodiment of the invention; and FIG. 7 is a flowchart of steps to modify packet routing based on user entitlements in accordance with an illustrative embodiment of the invention.

DETAILED DESCRIPTION

Figure 1A:
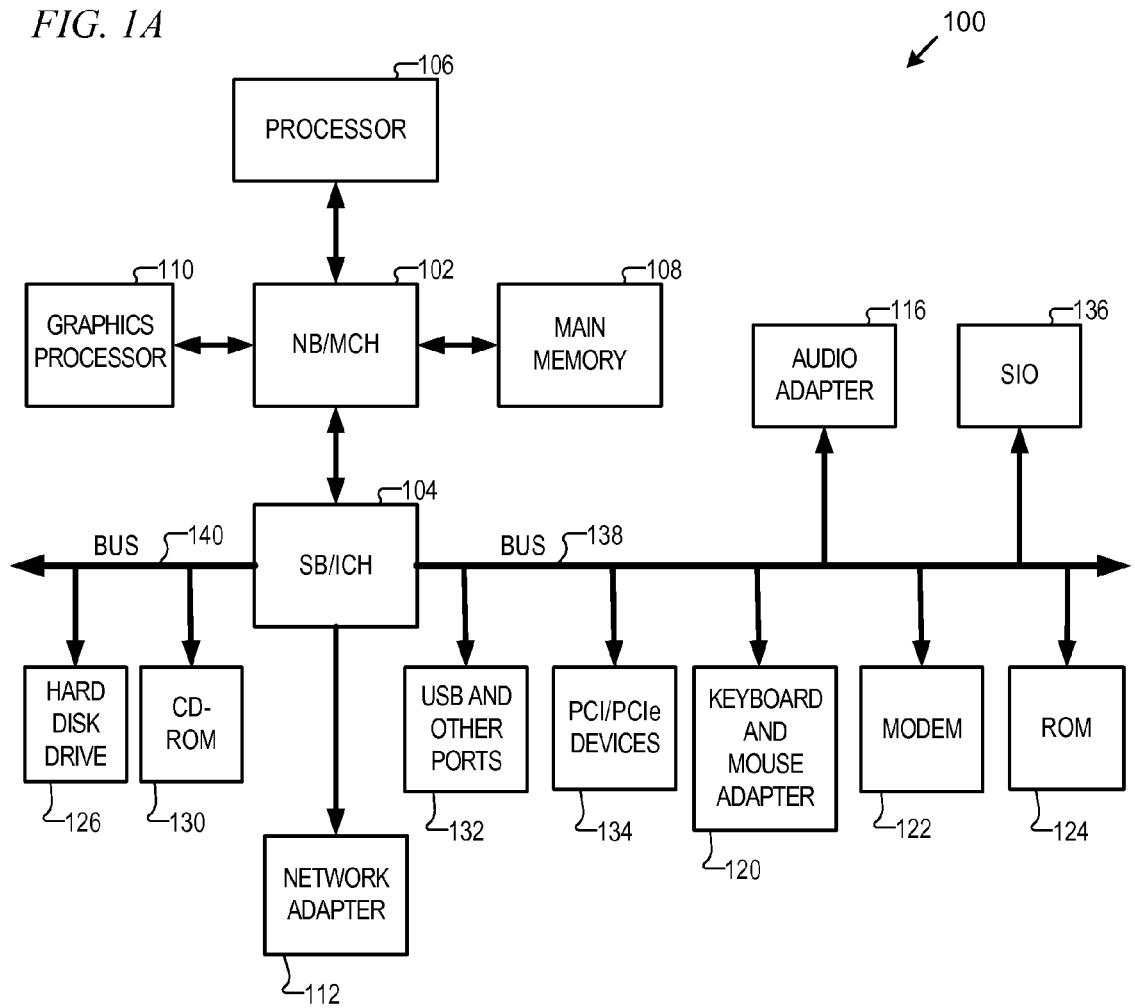
FIG. 1A is a data processing system in accordance with an illustrative embodiment of the invention.

With reference now to the figures and in particular with reference to FIG. 1A, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1A. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1A may vary depending on the implementation. Other internal hardware or peripheral devices, such as flash memory, equivalent non-volatile memory, and the like, may be used in addition to or in place of the hardware depicted in FIG. 1A. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1A is not meant to imply architectural limitations. For example, data processing system 100 also may be a tablet computer, laptop computer, or telephone device in addition to taking the form of a PDA.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage device that can direct a computer, other programmable data processing apparatus, or other devices to function in a particular manner, such that the instructions stored in the computer readable storage device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aspects of the illustrative embodiments provide a computer implemented method data processing system and computer program product for identifying subscribers that have entitlements established by a wireless carrier and providing additional data services to such subscribers when the subscribers access an access point owned or controlled by the wireless carrier. A subscriber is a data processing system that is portable, and can operate a networking client using one or more data networking links. The subscriber may be a mobile subscriber. The network can use, for example, Ethernet, IEEE standard wireless links, infrared as well as other electromagnetic radiation carried signaling links.

Figure 1B:
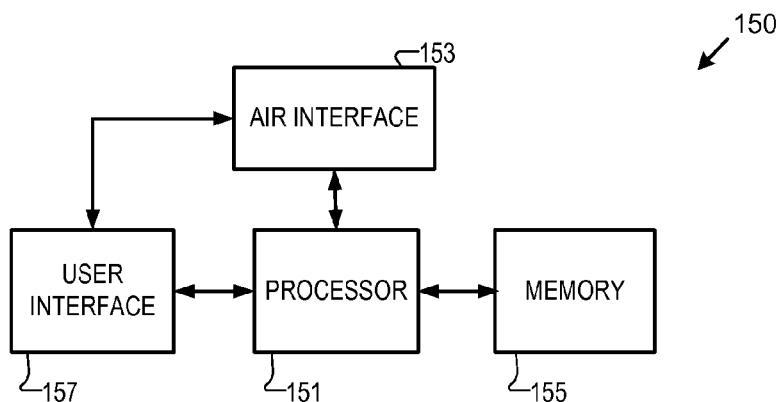
FIG. 1B is a subscriber in accordance with an illustrative embodiment of the invention.

FIG. 1B is a subscriber in accordance with an illustrative embodiment of the invention. Subscriber 150 may include processor 151, which handles data processing functions and may operate to provide protocol support for various wireless enabled technologies. Air interface 153 may receive data from the processor or directly from a microphone within user interface 157. Air interface 153 processes such data to form a wireless signal according to a wireless protocol. A wireless protocol may include, for example, paging protocols, cellular protocols, Wi-Fi protocols, short-range wireless protocols, and the like. Similarly, Air interface 153 may transform wireless signals arriving from the ambient environment to analog and digital forms for the processor or the user interface. Thus, the air interface can provide voice and/or graphical information to a user. Memory 155 provides working memory and/or storage for processor 151 to carry out its functions. The subscriber may be used as a stand-alone device used by consumers for mobile communications. The subscriber may perform the functions of a cellular telephone, a pager, a text messaging device and the like. The components described here represent a typical configuration. Additional hardware may be added. In addition, the subscriber can be embedded within a data processing system as, for example, a substitute for LAN adapter 112 in data processing system 100 of FIG. 1A. Subscriber may be equipped with one or more identifying addresses, for example, a mobile subscriber identity (MSI) housed within a subscriber identity module (not shown).

Figure 2:
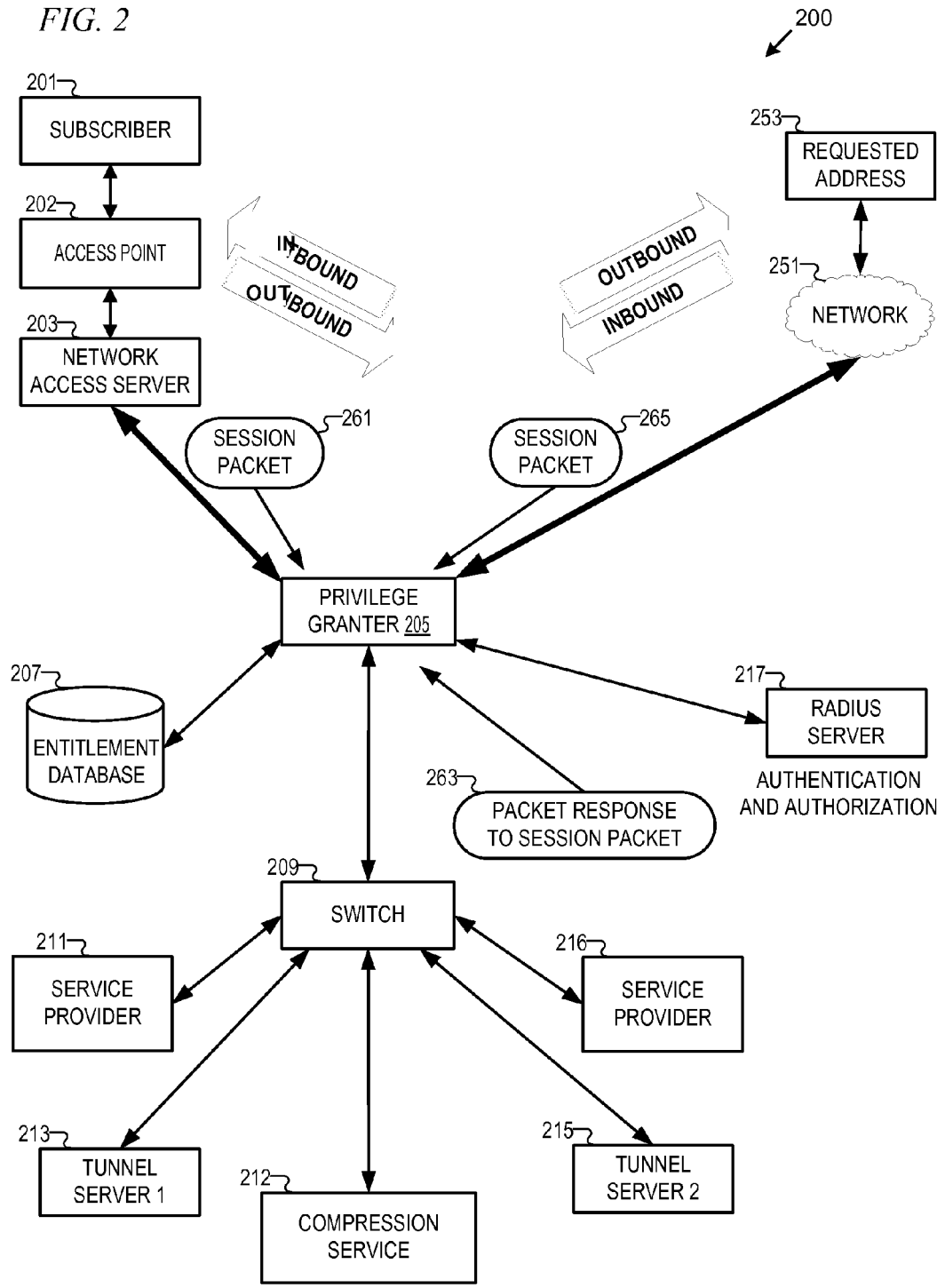
FIG. 2 is a network in accordance with an illustrative embodiment of the invention.

FIG. 2 is a network in accordance with an illustrative embodiment of the invention. In general, network 200 provides to subscribers the ability to wirelessly link to an access point to reach a broader network, such as the Internet. Subscribers can include subscriber 201, which may be a device used by a user. The user may have contracted to receive data services with a wireless carrier that owns or controls the access point. In other words, some subscribers may be registered with a wireless carrier for wireless service, where, as in this case, the wireless carrier owns or controls the access point. Ownership or control terminology describes the entity that is ultimately responsible for maintaining the access point, and does not include the wireless carriers that have roaming agreements with the entity that owns and controls the access point. Accordingly, a subscriber can also be a subscriber which obtains wireless access to access point 202 by virtue of a roaming agreement that permits the subscriber to operate on networks (and access points) of wireless carriers not owning or controlling the access point. A roaming agreement is an agreement between wireless carriers that permits a first wireless carrier to offer wireless services to a subscriber of the second wireless carrier that uses the infrastructure of the first wireless carrier.

Accordingly, subscriber 201 uses access point 202 to reach network access server 203. Network access server may relay packets to and from a data processing system that serves as a bottleneck or choke-point between the equipment located at or near the access point and a network 251. Privilege granter 205 may operate as the bottleneck, and accordingly have the power to inspect packets that traverse through the privilege granter.

Packets that traverse privilege granter 205 may be inbound or outbound relative to subscriber 201. Accordingly, packets that traverse from network access server to privilege granter 205 may be outbound while the reverse packet movement is inbound. Similarly, packets that traverse from privilege granter 205 to network 251 are outbound, while packets that move in the opposite direction are inbound relative to subscriber 201.

Some equipment that may be located at or near the access point include switch 209, service provider 211, compression service 212, tunnel server 1 213, tunnel server 2 215, and service provider 216. Switch may perform routing functions. Switch 209 may route based on internet protocol address, a Media Access Control (MAC) address and/or a virtual LAN (VLAN) address. A VLAN tag or VLAN address is an address used to identify a device or host on a network according to a virtual LAN standard. Accordingly, the VLAN tag can form the VLAN address and thereby be the basis for routing by switch 209. An addressable service is a service, executing on a processor, addressable by packets sent to an address. The address can be, for example, a VLAN address, a MAC address, an IP address and the like. Thus, addressable services may include service providers such as, for example, service provider 211, compression service 212, tunnel server 1 213, tunnel server 2 215, and service provider 216. It is appreciated that the services described herein are merely examples of possible service types available. Further addressable services will be apparent to one of ordinary skill in the art, and are accordingly included within the scope of the description.

In addition, the addressable service can be hosted within a data processor that supports other addressable services. In other words, a data processor may support multiple addressable services. By "convert" or "modify" it is meant that a packet or packets sent to the addressable service may be replaced with as many, fewer, or more packets that operate to perform the service. It is recognized that a compression service may convert, depending on the direction of the packet as inbound or outbound, a stream of packets by either compressing or decompressing the stream of packets. For example, a payloads of two session packets may be combined, at least in part, by compressing the payloads to form a compressed packet in response to the session packet or session packets. An example of a compression service is the gzip compression service, which is a data processing system that converts data according to the computer usable code instructions that rely on Lempel-Ziv (for example, LZ77) and/or Huffman coding. Compression can include converting multiple session packets or portions of packets into a compressed packet.

Privilege granter 205 may operate as an intermediary for authentication packet and packets responsive to the authentication packet that traverse between subscriber 201 and an authentication and authorization server. The authentication and authorization server may be Remote Authentication Dial In User Service (RADIUS or Radius) server 217. A Radius server is a server that satisfies the protocols defined by standards and draft standards such as the RFC 2865 of the Internet Engineering Task Force, herein incorporated by reference. The authentication and authorization server may also support accounting functions to identify amounts of data used and timing of such data use. The authentication and authorization server can be, for example, servers configured to operate according to the Diameter standard, as well as other authentication and authorization protocols. A diameter server can be a server that provides an addressable service according to the diameter base protocol as defined by RFC 3588 of the Internet Engineering Task Force, herein incorporated by reference.

Thus, by using the authentication and authorization server, an access point can admit or deny subscriber access according to contracts that apply to the subscriber. Such contracts may provide for direct use with the wireless carrier equipment or indirect use through roaming. In addition, the authentication and authorization server can be used as a source for service definitions that correspond with a particular subscriber, as selected by an owner or operator of the subscriber.

In response to authentication packets from the subscriber, an authentication and authorization server can respond with one or more service definition identifiers that specify which among several services a subscriber is entitled to use. A service definition identifier is a predetermined set of bits that is uniquely associated with a service definition. The service definition identifier may be used as a short hand for the more complex service definition, and accordingly occupy less networking traffic than the corresponding service definition. The operation of the service definition identifier is explained further below. In response, privilege granter 205 can monitor packets that the authentication and authorization server send to subscriber 201. Packets that provide service definition identifiers for a subscriber may be recorded at entitlement database 207 for future reference by privilege granter 205.

Privilege granter 205 is a data processing system, for example, data processing system 100 of FIG. 1A. Privilege granter 205 may perform two functions in the network. First, the privilege granter may monitor authentication packets to determine which among the subscribers is entitled to additional services from one or more addressable services. Second, the privilege granter may redirect session packets to one or more addressable services in order to provide value added services to a subset of subscribers.

Privilege granter 205 can work together with switch 209 to determine which, if any, addressable services are to be selected for further processing of inbound and/or outbound packets. Alternatively, privilege granter can independently determine which addressable services are to be selected. Such addressable services can influence the manner in which network 251 and a device reached through requested address 253 are communicated. Accordingly, in situations where an outbound packet such as session packet 261 is identified as corresponding to a subscriber having a user entitlement, the session packet can be rerouted, with modification to target address and/or encapsulation, to an addressable service, such as, for example, compression service 212. After receiving one or more such packets, compression service 212 can send the packet via privilege granter 205 as packet response to session packet 263. Privilege granter 205 can determine whether the packet response to session packet is to be routed further to the requested address, or whether the packet response to the session packet is to be further processed by another addressable service. A packet response to a session packet is a packet that has been processed at an addressable service, and reformed into at least one new packet and returned to the privilege granter. A packet response to a session packet is based on at least one session packet transmitted via the privilege granter to the addressable service.

By the same token, a packet that is inbound, for example session packet 265, can also be redirected through one or more addressable services, for example, where session packet 265 includes compressed data, and subscriber 201 is user entitled to compression. Like the outbound packet, privilege granter 205 can consult entitlement database 207 to determine if a source unique network identifier is present in the inbound packet that matches a row entry to entitlement database 207. Responsive to finding a match, privilege granter can redirect inbound packets to one or more addressable services. A source unique network identifier is an identifier of a subscriber that is unique to the mobile subscriber on, for example, a local area network, globally, or any sub-network of the internet.

Figure 3:
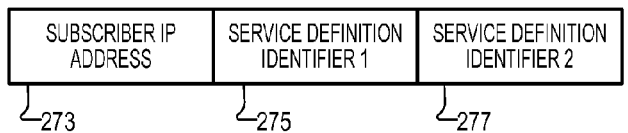
FIG. 3 describes the content of a row entry or entitlement database record in accordance with an illustrative embodiment of the invention.

FIG. 3 describes the content of a row entry or entitlement database record in accordance with an illustrative embodiment of the invention. An entitlement database is a database, accessible to a privilege granter, which provides a look-up table that may match a source unique network identifier to one or more services. A row entry to the entitlement database can comprise the source unique network identifier, one, multiple, or no service definition identifiers. A row entry may persist in an entitlement database for as long as a subscriber is authenticated to a network operated by a wireless carrier. Each service definition that appears in the row entry is considered a user entitlement. A user entitlement is a service, as identified, for example, by a service definition identifier, matched with a source unique network identifier. In other words, a user entitlement may appear within an entitlement database, and within a row entry for an entitlement database. For example, entitlement database record 270 may include a source unique network identifier, for example subscriber internet protocol (IP) address 273. One or more service definition identifiers can be stored in a row entry, for example, service definition identifier 1 275 or service definition identifier 2 277. Alternatively, the privilege granter can store a zero or another place-keeper as the service definition for cases where a subscriber has no privileges to use addressable services. A service definition identifier is unique for a specific service or version of a service. Accordingly, rather than identify a specific device, the service definition identifier is descriptive of the type of service. Types of service can be, for example, compression services, virtual private networking services that route traffic through a corporate firewall for further processing, encryption services, and the like. Such services may be mapped to two-bytes as one or more data fields in the entitlement database record. The data fields serve as a service definition identifier, in a manner to uniquely distinguish one addressable service type to another. An alternative format for the entitlement database record can be one where there is a one-to-one correspondence between the subscriber IP address and a single service definition identifier. Accordingly, in this form, the subscriber IP address can appear on multiple records depending on the number of services to which the subscriber is entitled.

Figure 4A:
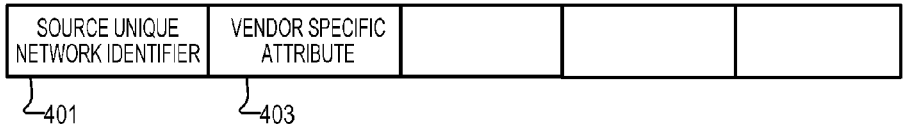
FIG. 4A is an authentication packet in accordance with an illustrative embodiment of the invention.

FIG. 4A is an authentication packet in accordance with an illustrative embodiment of the invention. Authentication packet 400 includes data fields used by authentication and authorization servers, as described above. In addition, the authentication packet may include vendor specific attribute 403 or other flag. A vendor specific attribute (VSA) is at least one bit set in an authentication packet that indicates to an authentication service that a subscriber requests segregation of traffic to and/or from the subscriber so that added services or alternative service may be provided the subscriber, as compared to subscribers that fail to set the VSA in an authentication packet. As is typical of the authentication packet, the packet includes a source unique network identifier 401. The source unique network identifier may be a target address or a source address of the authentication packet. It is appreciated that the authentication packet can be, alternatively, according to the DIAMETER protocol, or any other authenticating protocol. Additional fields in the packet may include credentials and acknowledgements, among other data.

Figure 4B:
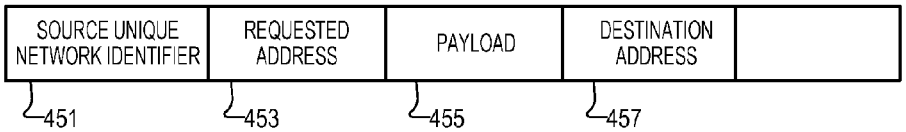
FIG. 4B is a session packet in accordance with an illustrative embodiment of the invention.

FIG. 4B is a session packet in accordance with an illustrative embodiment of the invention. A session packet is a packet sent during a session authenticated by a network operated, at least in part, by a wireless carrier. A session packet can be one of several packets sent during a session established to stream information from a domain having one or more web hosts or other networking hosts. Session packet 450 can include source unique network identifier 451, requested address 453, payload 455, and destination address 457. The unique network identifier can be, for example, a source address in the form of an internet protocol address. The destination address and source address, if any, can also include a port number.

Figure 5:
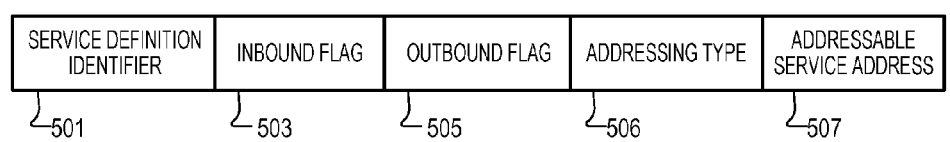
FIG. 5 is a service definition in accordance with an illustrative embodiment of the invention.

FIG. 5 is a service definition in accordance with an illustrative embodiment of the invention. The service definition may be stored in a table at the privilege granter. Service definition 500 may include service definition identifier 501, inbound flag 503, outbound flag 505, addressing type 506, and addressable service address 507. The service definition identifier is explained above. The inbound flag and the outbound flags are, respectively, indicators of whether the service is to be used on packets that arrive inbound or outbound from and/or to a network, for example, network 251 of FIG. 2. Addressing type 506 is a field that specifies the form in which the addressable service address is. Addressable service address 507 is the address within the network local to the access point, of the addressable service. The addressing type can be, for example, Virtual LAN (VLAN), IP address, or Media Access Control (MAC) address, among others. Accordingly, strings such as VLAN, IP or may be identifiers of service address type, respectively, VLAN address type, internet protocol address type and media access control address type. Thus, the addressable service address can be a virtual local area network identifier (VID). A VID can identify which VLAN a frame belongs. The VID can be 12 bits long, and be placed in a packet in the manner described by IEEE 802.1Q.

FIG. 6 is a flowchart that describes steps to monitor authentication packets in accordance with an illustrative embodiment of the invention. An authentication packet may be a packet transmitted by a subscriber to an authentication service of a wireless carrier for authenticating the subscriber, where the wireless carrier is one with which the subscriber is registered. In addition, the authentication packet may be a response packet sent from an authentication server to a network access server in order to confirm an authentication as well as to provide additional information, such as session information. The session information can include IP addresses and session time-outs as well as other information stored to a subscriber entry at the authentication server. In flowchart 600, initially, a privilege granter may receive an authentication packet. Accordingly, for each packet received, the privilege granter may determine whether an authentication packet is received (step 601). Absent the authentication packet being received, the privilege granter may repeat step 601. However, if an authentication packet is received, the privilege granter may determine if a VSA is set within the packet (step 603). A positive result at step 603 may cause the privilege granter to obtain the source unique network identifier of the packet (step 605). Next, the privilege granter may obtain a second packet, that is, a response authentication packet (step 607). A response authentication packet is a packet that may be transmitted to a subscriber in response to authentication prerequisites being met. The response authentication packet can have at least one service definition identifier. In addition, the subscriber may be registered with the wireless carrier that operates the access point local to the privilege granter.

Next, the privilege granter may determine if at least one service definition identifier is present (step 609). A positive determination may result in the privilege granter storing the source unique network identifier and at least one service definition identifier to an entitlement database (step 613). The entitlement database can be, for example, entitlement database 270, of FIG. 3. As a result of storing the source unique network identifier with at least one service definition identifier, the privilege granter builds a record in the entitlement database which pairs at least one service definition identifier to the source unique network identifier. Next, the privilege granter may forward the response packet (step 615). The packet, in this case, is the response authentication packet. Processing may terminate thereafter.

A negative determination at steps 603 and 609 may result in the privilege granter storing the source unique network identifier without a service definition identifier in the entitlement database (step 623). Accordingly, the privilege granter can record that the source unique network identifier lacks a user entitlement. Next, the privilege granter may forward the packet (step 615). Processing may terminate thereafter.

FIG. 7 is a flowchart of steps to modify packet routing based on user entitlements in accordance with an illustrative embodiment of the invention. Initially, the privilege granter may determine that it has received a session packet having an address (step 701). Responsive to a positive determination, the service provider may further determine if the session packet's source unique network identifier matches a record in an entitlement database (step 703). The entitlement database can be, for example, entitlement database 270 of FIG. 2. A negative determination at either step 701 can cause the privilege granter to repeat step 701.

A positive determination at step 703 may cause the privilege granter to obtain a first or a next service definition identifier (step 705). In other words, the privilege granter may look up the service definition identifier based on the packet's source unique network identifier. For example, if an entitlement database record included a service definition identifier for a compression service and for a tunnel service (VPN), each repeat of step 705 may result in privilege granter obtaining first, a service definition identifier for the compression service, and second, a service definition identifier for the tunnel service of, for example, FIG. 2.

Next, the privilege granter may look up a service definition for service definition identifier (step 707). The privilege granter may perform this step by looking up a service definition in, for example, the form of service definition 500 of FIG. 5. Next, the privilege granter may route the session packet, to an addressable service, according to the service definition (step 709). The routing may specifically rely on an addressable service address found in the service definition. Accordingly, using the addressable service address, the privilege granter can locate the service and route the packet.

Next, the privilege granter may determine whether the privilege granter has received a packet response to the session packet from service provider (step 715). This determination may include inspecting a VLAN tag and/or hardware addresses in a packet. The inspection may be directed only to the hardware addresses in a packet or IP addresses in the packet, wherein the choice of what type of address is determined by the addressing type implemented in the embodiment, or as may be set in addressing type 506 of FIG. 5. A packet response to a session packet is a packet sent from a host in response to a session packet that is a packet sent according to a protocol to, for example, set-up, modify, operate, or tear down a session. A session is any unique connection between a particular subscriber and a requested address. A packet response to a session packet can itself be a response to a packet response to a session packet. A negative result at step 715 can cause repeated determinations using step 715. A positive determination may cause the privilege granter to determine if more service providers or addressable services are in an entitlement database record (step 717). A positive determination at this step may result in the privilege granter repeating step 705 and any subsequent steps.

Alternatively, the privilege granter may determine no more service providers are in an entitlement database record. In such a case, the privilege granter may route the session packet based on the destination address of the session packet step 704. The session packet's destination address may be in the form in which it was dispatched from the last service provider. Moreover, step 704 can be executed after a negative determination to step 703. In other words, step 704 can be executed in response to failing to find the session packet's source unique identifier in the entitlement database. Processing may terminate thereafter.

Step 717 may be one step among several that cause a session packet, or at least packets derived therefrom, to take multiple trips through the privilege granter before being routed outbound from the local network or routed inbound to the subscriber. For example, a first session packet can be routed to a first addressable service. The first addressable service can modify the session packet to form a first modified packet. The privilege granter may receive the first modified packet at step 717, and determine that further addressable services are required. Accordingly, the privilege granter may route the first modified packet to a second addressable service, based on a second user entitlement present in the entitlement database. Subsequently, the second addressable service further modifies the first modified packet to form a second modified packet based on the second user entitlement and the second modified packet. Next, the privilege granter can receive the second modified packet. Responsive to receiving the second modified packet, privilege granter, at step 717, may determine that no further service providers or addressable services are in the entitlement database record. A modified packet is a packet that derives from, directly or indirectly, in whole or in part, a session packet. Accordingly, the privilege granter may route the second modified packet to the requested address or to the subscriber, based on, respectively, the session packet being outbound or inbound. A negative determination at step 717 directs the privilege granter to perform step 704.

Step 709 can include routing the session packet to a compression service. The compression serve can convert a Hypertext Transfer Protocol (HTTP) request of the session packet to include a compression tag. The inclusion of a compression tag can include updating the packet or adding an accept-encoding tag so that the packet includes the gzip compression method. This step can occur when the subscriber makes a request to the requested address, for example, a web page. Next, the privilege granter can route the session packet to a target address of the session packet.

Within a gzip-enabled session, inbound session packets arrive compressed. These inbound session packets can result when session packets have, first, left the domain of the access point, second, been processed by the requested address and, third, returned to the privilege granter in compressed form. Accordingly, the privilege granter may route such packets to the compression service which, in turn, converts the responses to the HTTP request to an uncompressed one or more packets. Thus, the subscriber may not need to support compression in order to benefit from compression during the session.

Another example of an addressable service to which step 709 can direct the session packet is a virtual private network (VPN) gateway. Such a service could be used to direct all network traffic for a mobile subscriber be sent to a designated VPN gateway, for example, to a VPN server of the organization paying for the mobile subscriber use. Such a VPN gateway may receive the session packet and encode the session packet using a VPN protocol. The privilege granter may order the sequence of services to process a session packet so that the VPN gateway is a final addressable service to which the session packet, or its derivative packet, is dispatched.

The illustrative embodiments permit a subscriber to self-identify and initially trigger a privilege granter to detect that the subscriber is a non-roaming subscriber on an access point. Providing the subscriber authenticates, the privilege granter can monitor any entitlements defined in an authorization packet from an authorization server. Subsequent packets traversing the privilege granter during the subscriber's session can be routed to addressable services such that value is added to communications between the subscriber and a requested address on a network such as, for example, the Internet.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-readable storage device providing program code for use by or in connection with a computer or any instruction execution system. For the purposes of this description, a computer readable storage device can be any tangible apparatus that can store the program for use by or in connection with the instruction execution system, apparatus, or device.

The computer-readable storage device can be an electronic, magnetic, optical, electromagnetic, or semiconductor system (or apparatus or device. Examples of a computer-readable storage devices include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The term "computer-readable storage device" does not include a signal propagation media such as a copper transmission cable, an optical transmission fiber or a wireless transmission media.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method to process message packets, the method comprising the steps of:
    a control computer node receiving, from a client computer of a first user, a first message packet specifying a first destination address, and in response, the control computer node determining from a table indexed by users that message packets received from the first user should be compressed, and in response to receipt of the first message packet and the table, the control computer node forwarding the first message packet to a compression/decompression computer node, different than a destination computer node at the first destination address, to compress the first message packet;
    the control computer node subsequently receiving from the compression/decompression computer node a compressed form of the first message packet;
    the control computer node determining, from the table, that message packets received from the first user should also be encrypted, and in response, the control computer node forwarding the compressed first message packet to an encryption/decryption computer node, different than the destination computer node and the compression/decompression computer node, to encrypt the compressed first message packet;
    the control computer node subsequently receiving from the encryption/decryption computer node an encrypted form of the compressed first message packet, and in response, the control computer node determining from the table that message packets received from the first user should not be further modified before being sent to the first destination address, and in response, the control computer node forwarding the encrypted, compressed first message packet to the first destination address.

2. The method of claim 1, further comprising the steps of:
    the control computer node, receiving from a second client computer of the second user, a second message packet specifying a second destination address, and in response, the control computer node determining from the table that message packets received from the second user should be compressed, and in response to receipt of the second message packet and the table, the control computer node forwarding the second message packet to the compression/decompression computer node, different than a computer node at the second destination address, to compress the second message packet;
    the control computer node subsequently receiving from the compression/decompression computer node a compressed form of the second message packet, and in response, the control computer node determining, from the table that message packets received from the second user should not be further modified, and in response, the control computer node forwarding a compressed form of the second message packet to the second destination address.

3. The method of claim 2, further comprising the steps of:
    the control computer node receiving a first authentication packet from the client computer of the first user, prior to the control computer node receiving the first packet, and in response, the control computer node forwarding the first authentication packet to an authentication computer node;
    the control computer node receiving, from the authentication computer node, a packet in response to the forwarded first authentication packet, and in response, determining that the response packet contains a service definition of an encryption service and a compression service for the first user, and in response, the control computer node storing the first user, together with the service definition to the table, wherein the subsequent steps of determining that message packets received from the first user should be compressed and determining that message packets received from the first user should also be encrypted, occur after the storing step.

4. The method of claim 3, wherein the step of determining that the response packet contains a service definition of an encryption service and a compression service for the first user, comprises the step of the control computer node conditionally storing the first user, together with the service definition to the table, based on a bit setting within the authentication packet.

5. The method of claim 1, further comprising the steps of:
    the control computer node receiving a third message packet specifying the first user, and in response, the control computer node determining, from the table, that message packets received and destined for the first user should also be decrypted, and in response, the control computer node forwarding the third message packet to the encryption/decryption computer node to decrypt the third message packet;
    the control computer node subsequently receiving from the encryption/decryption computer node a decrypted form of the third message packet, and in response, the control computer node determining from the table, that the decrypted third message packets destined for the first user should also be decompressed, and in response, the control computer node forwarding the decrypted third message packet to the compression/decompression computer node, to decompress the decrypted third message packet;
    the control computer node subsequently receiving from the compression/decompression computer node a decompressed form of the decrypted third message packet, and in response, the control computer node determining from the table that decrypted and decompressed message packets destined for the first user should not be further modified before being sent to the first user, and in response, the control computer node forwarding the decrypted and decompressed third message packet to the first user.

6. The method of claim 1, further comprising the steps of:

the control computer node receiving a second authentication packet from a client computer of a second user, and in response, the control computer node forwarding the second authentication packet to the authentication computer node;

the control computer node receiving, from the authentication computer node, a packet in response to the second authentication packet, and in response, determining that the response packet contains no service definitions for the second user, and in response, the control computer node storing the second user, without any associated service definition to the table;

the control computer node receiving, from the second user, a second message packet from the second client computer of the second user, the second message packet specifying a second destination address, and in response, the control computer node determining from the table, that message packets from the second user are unassociated to any service definition, and in response, the control computer node forwarding the second message packet to the second destination address.

7. A computer program product for processing message packets, the computer program product comprising:

a computer-readable storage device having program instructions stored thereon, the program instructions comprising:

program instructions for a control computer node to receive, from a client computer of a first user, a first message packet specifying a first destination address, and in response, program instructions for the control computer node to determine from a table indexed by users that message packets received from the first user should be compressed, and in response to receipt of the first message packet and the table, program instructions for the control computer node to forward the first message packet to a compression/decompression computer node, different than a destination computer node at the first destination address, to compress the first message packet;

program instructions for the control computer node subsequently to receive from the compression/decompression computer node a compressed form of the first message packet;

program instructions for the control computer node to determine, from the table, that message packets received from the first user should also be encrypted, and in response, program instructions for the control computer node to forward the compressed first message packet to an encryption/decryption computer node, different than the destination computer node and the compression/decompression computer node, to encrypt the compressed first message packet;

program instructions for the control computer node subsequently to receive from the encryption/decryption computer node an encrypted form of the compressed first message packet, and in response, program instructions for the control computer node to determine from the table that message packets received from the first user should not be further modified before being sent to the first destination address, and in response, program instructions for the control computer node to forward the encrypted compressed first message packet to the first destination address.

8. The computer program product of claim 7, further comprising:

program instructions for the control computer node, to receive from a second client computer of the second user, a second message packet specifying a second destination address, and in response, program instructions for the control computer node to determine from the table that message packets received from the second user should be compressed, and in response to receipt of the second message packet and the table, program instructions for the control computer node to forward the second message packet to the compression/decompression computer node, different than a computer node at the second destination address, to compress the second message packet;

program instructions for the control computer node subsequently to receive from the compression/decompression computer node a compressed form of the second message packet, and in response, program instructions for the control computer node to determine, from the table that message packets received from the second user should not be further modified, and in response, computer instructions for the control computer node to forward a compressed form of the second message packet to the second destination address.

9. The computer program product of claim 8, further comprising:

program instructions for the control computer node to receive a first authentication packet from the client computer of the first user, prior to the control computer node receiving the first packet, and in response, program instructions for the control computer node to forward the first authentication packet to an authentication computer node;

program instructions for the control computer node to receive, from the authentication computer node, a packet in response to the forwarded first authentication packet, and in response, program instructions to determine that the response packet contains a service definition of an encryption service and a compression service for the first user, and in response, program instructions for the control computer node to store the first user, together with the service definition to the table, wherein the program instructions to determine that message packets received from the first user should be compressed and the program instructions to determine that message packets received from the first user should also be encrypted, are configured to be executed after execution of program instructions to store the first user.

10. The computer program product of claim 9, wherein the program instructions to determine that the response packet contains a service definition of an encryption service and a compression service for the first user, comprises program instructions for the control computer node to conditionally store the first user, together with the service definition to the table, based on a bit setting within the authentication packet.

11. The computer program product of claim 7, further comprising:

program instructions for the control computer node to receive a third message packet specifying the first user, and in response, program instructions for the control computer node to determine, from the table, that message packets received and destined for the first user should also be decrypted, and in response, program instructions for the control computer node to forward the third message packet to the encryption/decryption computer node to decrypt the third message packet;

program instructions for the control computer node to subsequently receive from the encryption/decryption computer node a decrypted form of the third message packet, and in response, program instructions for the control computer node to determine from the table, that the decrypted third message packets destined for the first user should also be decompressed, and in response, program instructions for the control computer node forward the decrypted third message packet to the compression/decompression computer node, to decompress the decrypted third message packet;

program instructions for the control computer node to subsequently receive from the compression/decompression computer node a decompressed form of the decrypted third message packet, and in response, program instructions for the control computer node to determine from the table that decrypted and decompressed message packets destined for the first user should not be further modified before being sent to the first user, and in response, program instructions for the control computer node to forward the decrypted and decompressed third message packet to the first user.

12. The computer program product of claim 7, further comprising:

program instructions for the control computer node to receive a second authentication packet from a client computer of a second user, and in response, program instructions for the control computer node to forward the second authentication packet to the authentication computer node;

program instructions for the control computer node to receive, from the authentication computer node, a packet in response to the second authentication packet, and in response, program instructions to determine that the response packet contains no service definitions for the second user, and in response, program instructions for the control computer node to store the second user, without any associated service definition to the table;

program instructions for the control computer node to receive, from the second user, a second message packet from the second client computer of the second user, the second message packet specifying a second destination address, and in response, program instructions for the control computer node to determine from the table, that message packets from the second user are unassociated to any service definition, and in response, program instructions for the control computer node to forward the second message packet to the second destination address.

13. A computer program product for processing message packets, the computer program product comprising:

a computer-readable storage device having program instructions stored thereon, the program instructions comprising:

program instructions for a control computer node to receive, from a client computer of a first user, a first message packet specifying a first destination address, and in response, program instructions for the control computer node to determine from a table indexed by users that message packets received from the first user should be encrypted, and in response to receipt of the first message packet and the table, program instructions for the control computer node to forward the first message packet to a encryption/decryption computer node, different than a destination computer node at the first destination address, to encrypt the first message packet;

program instructions for the control computer node subsequently to receive from the encryption/decryption computer node an encrypted form of the first message packet;

program instructions for the control computer node to determine, from the table, that message packets received from the first user should also be compressed, and in response, program instructions for the control computer node to forward the encrypted first message packet to an compression/decompression computer node, different than the destination computer node and the encryption/decryption computer node, to compress the encrypted first message packet;

program instructions for the control computer node subsequently to receive from the compression/decompression computer node a compressed form of the encrypted first message packet, and in response, program instructions for the control computer node to determine from the table that message packets received from the first user should not be further modified before being sent to the first destination address, and in response, program instructions for the control computer node to forward the encrypted compressed first message packet to the first destination address.

14. The computer program product of claim 13, further comprising:

program instructions for the control computer node, to receive from a second client computer of the second user, a second message packet specifying a second destination address, and in response, program instructions for the control computer node to determine from the table that message packets received from the second user should be encrypted, and in response to receipt of the second message packet and the table, program instructions for the control computer node to forward the second message packet to the encryption/decryption computer node, different than a computer node at the second destination address, to encrypt the second message packet;

program instructions for the control computer node subsequently to receive from the encryption/decryption computer node an encrypted form of the second message packet, and in response, program instructions for the control computer node to determine, from the table that message packets received from the second user should not be further modified, and in response, program instructions for the control computer node to forward an encrypted form of the second message packet to the second destination address.

15. The computer program product of claim 14, further comprising:

program instructions for the control computer node to receive a first authentication packet from the client computer of the first user, prior to the control computer node receiving the first packet, and in response, program instructions for the control computer node to forward the first authentication packet to an authentication computer node;

program instructions for the control computer node to receive, from the authentication computer node, a packet in response to the forwarded first authentication packet, and in response, program instructions to determine that the response packet contains a service definition of an encryption service and a compression service for the first user, and in response, program instructions for the control computer node to store the first user, together with the service definition to the table, wherein the program instructions to determine that message packets received from the first user should be encrypted and determining that message packets received from the first user should also be compressed, are configured to be executed after execution of program instructions to store the first user.

16. The computer program product of claim 15, wherein the program instructions to determine that the response packet contains a service definition of an encryption service and a compression service for the first user, comprises program instructions for the control computer node to conditionally store the first user, together with the service definition to the table, based on a bit setting within the authentication packet.

17. The computer program product of claim 13, further comprising:
   program instructions for the control computer node to receive a third message packet specifying the first user, and in response, program instructions for the control computer node to determine, from the table, that message packets received and destined for the first user should also be decompressed, and in response, program instructions for the control computer node to forward the third message packet to the compression/decompression computer node to decompress the third message packet;
   program instructions for the control computer node to subsequently receive from the compression/decompression computer node a decompressed form of the third message packet, and in response, program instructions for the control computer node to determine from the table, that the decompressed third message packets destined for the first user should also be decrypted, and in response, program instructions for the control computer node forward the decompressed third message packet to the encryption/decryption computer node, to decrypt the decompressed third message packet;
   program instructions for the control computer node to subsequently receive from the encryption/decryption computer node a decrypted form of the decompressed third message packet, and in response, program instructions for the control computer node to determine from the table that decrypted and decompressed message packets destined for the first user should not be further modified before being sent to the first user, and in response, program instructions for the control computer node to forward the decrypted and decompressed third message packet to the first user.

18. The computer program product of claim 13, further comprising:
   program instructions for the control computer node to receive a second authentication packet from a client computer of a second user, and in response, program instructions for the control computer node to forward the second authentication packet to the authentication computer node;
   program instructions for the control computer node to receive, from the authentication computer node, a packet in response to the second authentication packet, and in response, program instructions to determine that the response packet contains no service definitions for the second user, and in response, program instructions for the control computer node to store the second user, without any associated service definition to the table;
   program instructions for the control computer node to receive, from the second user, a second message packet from the second client computer of the second user, the second message packet specifying a second destination address, and in response, program instructions for the control computer node to determine from the table, that message packets from the second user are unassociated to any service definition, and in response, program instructions for the control computer node to forward the second message packet to the second destination address.

* * * * *